Figure 3:
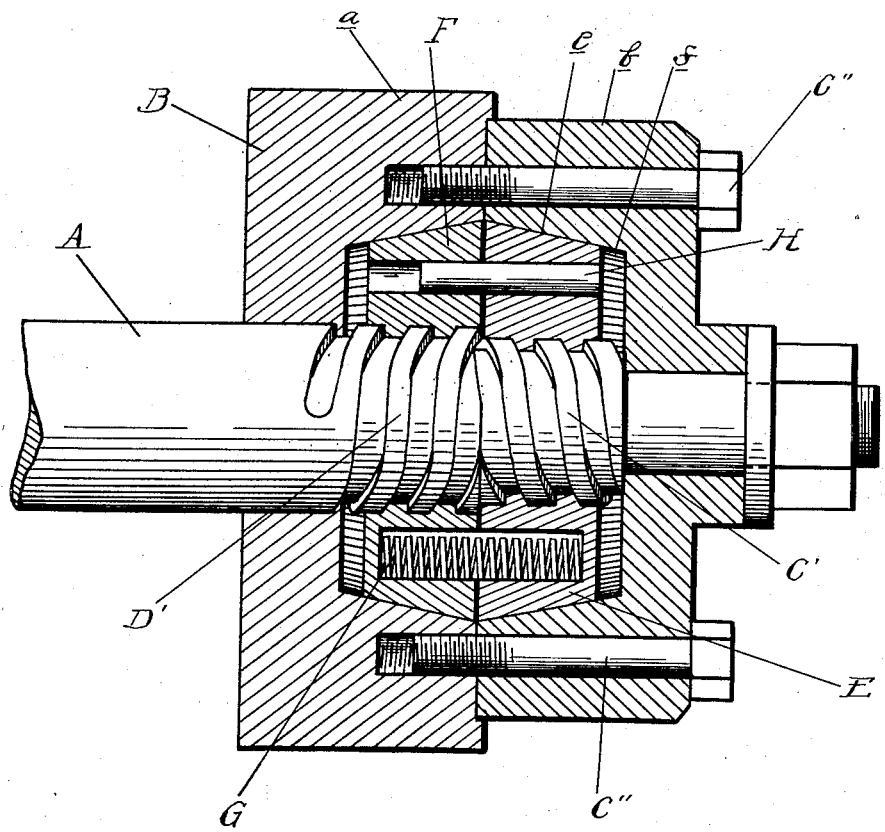

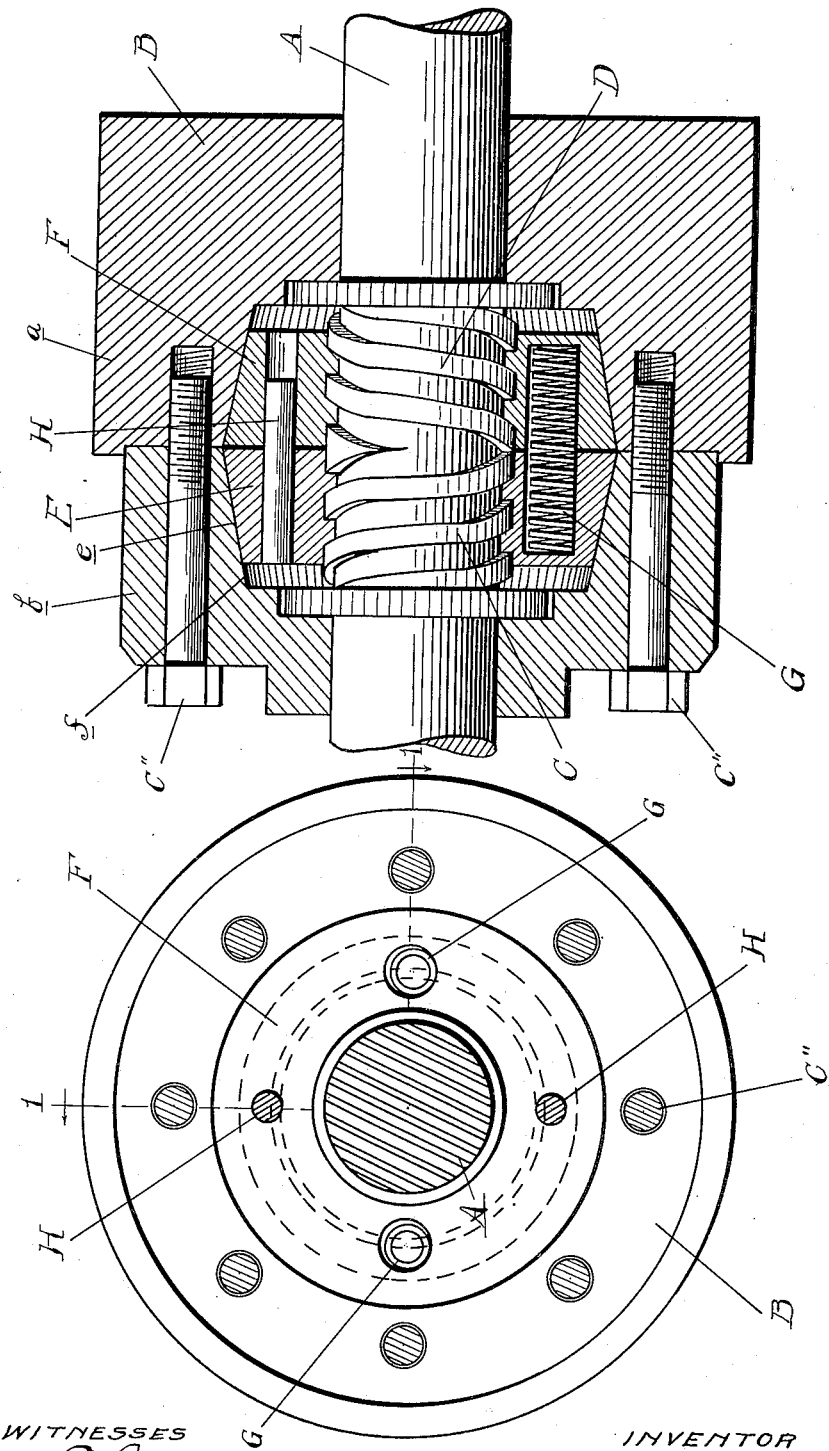

No. 852,587.

PATENTED MAY 7, 1907.

M. J. L. TOWLER.
AUTOMATIC CLUTCH.
APPLICATION FILED APR. 2, 1906.

2 SHEETS—SHEET 2.

WITNESSES

INVENTOR
MAXIMILIAN·J·L·TOWLER
BY Whittemore, Hulbert & Whittemore
ATT'YS.

UNITED STATES PATENT OFFICE.

MAXIMILIAN J. L. TOWLER, OF DETROIT, MICHIGAN.

AUTOMATIC CLUTCH.

No. 852,587.　　　Specification of Letters Patent.　　　Patented May 7, 1907.

Application filed April 2, 1906. Serial No. 309,534.

*To all whom it may concern:*

Be it known that I, MAXIMILIAN J. L. TOWLER, a citizen of the United States of America, residing at Detroit, in the county of Wayne and State of Michigan, have invented certain new and useful Improvements in Automatic Clutches, of which the following is a specification, reference being had therein to the accompanying drawings.

The invention relates to clutches designed for use in coupling revoluble members and adapted to automatically engage when the drive member is revolved in one direction, and to automatically release upon a reverse rotation.

The invention consists in the novel construction as hereinafter set forth.

In the drawings, Figure 1 is a longitudinal central section through the coupling; Fig. 2 is a cross section; and Fig. 3 is a view similar to Fig. 1, illustrating a modification.

A is a shaft and B a member revolubly mounted thereon, the one constituting the drive and the other the driven member. The shaft A has a threaded portion, in engagement with which is a member having a friction face for bearing upon the member B, and the engagement is such that a rotation of said member in one direction on the thread will cause the engagement of the friction faces. Means is also provided for constantly holding the friction faces in contact, but by a pressure so slight as not to introduce any material element of friction. Thus, either of the members A B may be freely revolved in relation to the other member in one direction, viz. that which would withdraw the friction member from its bearing, but when the rotation is in the opposite direction the slight friction between the contacting friction faces will cause the instantaneous locking of the parts.

For accomplishing the result above described, I preferably employ the construction shown, in which the shaft A is provided with two oppositely-threaded portions C D, being respectively right and left, and place in engagement respectively with these threaded portions the oppositely-facing friction members E F. These friction members are preferably of frusto-conical form, having oppositely-tapering peripheral faces, and both members are arranged within a recess in the member B, having correspondingly oppositely-tapered walls. This recess may be formed by making the member B in two sections $a\ b$, secured to each other by the clamping-bolts $C^2$. The proportion of the parts is preferably such that when the members E F are in contact with each other, their peripheral faces $e$ will just clear the tapering wall $f$ of the recess. A very slight opposite longitudinal movement of said members will, however, cause them to frictionally engage with the member B.

To cause the automatic engagement of the clutch, the members E F must be in constant frictional engagement with the member B. For this purpose I provide springs G or other suitable means for yieldably pressing said members E F away from each other, and to cause an equal movement of each member they are connected by slidable coupling pins H. These compel the members to rotate together, while permitting freedom of longitudinal movement, and if the threads C D are of the same pitch both members will move equally in opposite directions. In order that the springs G may actuate the members E F, the pitch of the threads C D must be such that a force parallel to the axis acting thereon will be outside the angle of friction. When thus proportioned, contact between the friction faces $e\ f$ is constantly maintained by the pressure of the springs, but the pressure is so slight that no appreciable resistance is offered to the relative rotation of the members in one direction.

In assembling the parts, the members E F may be engaged with the threaded portions C D from opposite ends thereof, the springs G and pins H being first positioned. If it is desirable to engage both of these members with their respective threads from one end of the shaft, this may be accomplished in the modification illustrated in Fig. 3, in which the threads C' D' are of different diameters, the former providing clearance for the passage of the oppositely-threaded member F into engagement with the threaded portion D'.

What I claim as my invention is:—

1. The combination of two concentric relatively revoluble members, a member adapted to frictionally engage one of said revoluble members and having a threaded engagement with the other revoluble member, whereby the said frictional engagement is respectively increased or diminished by opposite relative rotations of said revoluble members, and means for holding the frictionally-engaging members constantly in slight frictional contact, for the purpose described.

2. The combination with a revoluble member, of a recessed member sleeved thereon, a pair of members within said recess having opposed frictional bearings upon said recessed member and respectively a right and a left threaded engagement with said revoluble member, and resilient means for yieldably pressing said pair of members toward their respective frictional bearings upon said recessed member.

3. The combination with a revoluble member, a recessed member sleeved thereon, a pair of members within said recess having opposed frictional bearings upon said recessed member and respectively a right and a left threaded engagement with said revoluble member, a slidable longitudinally-extending coupling between said pair of members, and a spring within a recess in said pair of members for yieldably pressing the same in opposite directions toward said opposed frictional bearings.

4. The combination with a revoluble member, of a recessed member sleeved thereon, a pair of members within said recess having oppositely-tapering peripheral frictional bearings upon said recessed member and respectively a right and left threaded engagement with said revoluble member, a pin forming a longitudinally-slidable coupling between said pair of members, and a plurality of springs for yieldably pressing the members of said pair toward their respective frictional bearings.

5. The combination with a revoluble member, of a recessed member sleeved thereon, a pair of members within said recess having a peripheral frictional bearing upon said recessed member and respectively a right and left threaded engagement with said revoluble member, the maximum diameter of one of said threaded portions being no greater than the minimum diameter of the other portion.

6. The combination with two relatively revoluble members, of a member having a friction bearing on one of said revoluble members and a threaded engagement with the other revoluble member by which it is moved toward or from said bearing, and automatic means for holding the friction faces in constant contact, for the purpose described.

7. The combination with two relatively revoluble members, of a member having a friction bearing on one of said revoluble members and a threaded engagement with the other revoluble member, and means for yieldably pressing the friction faces in constant contact, for the purpose described.

8. The combination with two relatively revoluble members, of a member having a threaded engagement with one of said revoluble members and a friction bearing on the other revoluble member, and means pressing upon said friction member and re-acting upon said threaded engagement outside of the angle of friction, by which said friction member is yieldably held in constant contact with said friction bearing.

9. The combination with two relatively revoluble members, of a pair of friction locking members having opposed bearings upon one of said revoluble members and respectively a right and a left threaded engagement with the other revoluble member, and a resilient member for pressing said friction members away from each other, the force thereof re-acting on said threaded portion so as to be outside the angle of friction.

In testimony whereof I affix my signature in presence of two witnesses.

MAXIMILIAN J. L. TOWLER.

Witnesses:
JAMES P. BARRY,
AMELIA WILLIAMS.